United States Patent [19]

Seaver et al.

[11] Patent Number: 4,937,689

[45] Date of Patent: Jun. 26, 1990

[54] APPARATUS FOR CONTROLLING SEEK STRATEGY OF READ/WRITE HEAD IN A DISK DRIVE

[75] Inventors: Jay Seaver, Sunnyvale; Frank Seuberling, Fremont, both of Calif.

[73] Assignee: Maxtor Corporation, San Jose, Calif.

[21] Appl. No.: 276,789

[22] Filed: Nov. 28, 1988

Related U.S. Application Data

[62] Division of Ser. No. 919,084, Oct. 14, 1986, abandoned.

[51] Int. Cl.$^5$ .............................................. G11B 5/55
[52] U.S. Cl. ................................. 360/78.07; 360/78.06
[58] Field of Search ................. 360/78.06, 78.07, 78.14

[56] References Cited

U.S. PATENT DOCUMENTS

| | | | |
|---|---|---|---|
| 3,699,555 | 10/1972 | Du Vall | 318/617 |
| 3,798,427 | 3/1974 | Connors | 318/571 |
| 4,103,314 | 7/1978 | Case | 360/78.07 |
| 4,488,179 | 12/1984 | Axmear et al. | 360/78.06 |
| 4,494,159 | 1/1985 | Takayama et al. | 360/78.11 |

Primary Examiner—Alan Faber
Assistant Examiner—David L. Robertson
Attorney, Agent, or Firm—Hecker & Harriman

[57] ABSTRACT

In a hard disk drive memory, a device for controlling a seek operation in which the head is gradually accelerated, then gradually decelerated to move the head quickly from one track to another. The head detects the current track position and triggers a "seek profile" based on the distance of the destination track whereby the device determines the ideal acceleration curve for the seek to be performed. From this, the head begins the seek over a series of consecutive time segments, monitoring its position and determining nominal position at the end of the next successive time segment. In this way the seek profile is updated at each small time segment. Thus, the final head placement is more accurate than in conventional art, in which only an initial distance estimate is used to guide the placement of head. The gradual acceleration/deceleration of the head reduces noise and system wear compared with the full-power acceleration/deceleration utilized in the prior art.

9 Claims, 10 Drawing Sheets

CLASS 1

CLASS 2

CLASS 0

CLASS 1

CLASS 2

APPARATUS FOR CONTROLLING SEEK STRATEGY OF READ/WRITE HEAD IN A DISK DRIVE

This is a divisional of application Ser. No. 919,084, filed Oct. 14, 1986 now abandoned.

BACKGROUND OF THE INVENTION

1. Field of the Invention

This invention relates to the field of positioning the head assemblies of disk storage mechanisms, particularly during seek operations.

2. Background Art

In present day data processing systems, it is desired to provide a large amount of memory which can be accessed in a minimum amount of time. One type of memory which has enjoyed widespread use in the data processing field is that of magnetic media disk memories.

In general, disk memories are characterized by the use of one or more magnetic media disks stacked on a spindle assembly and rotating at a high rate of speed. Each disk is divided into a plurality of concentric "tracks" with each track being an addressable area of the memory array. The individual tracks are accessed through magnetic "heads" which fly over the disks on a thin layer of air. Typically, the disks are two sided with a head accessing each side.

The heads are in substantial alignment and are pivotally mounted to an actuator motor. The actuator motor may be a "voice coil" electrodynamic motor which has a coil moving within a permanent magnet, defining a cylindrical core. Alternatively, the motor may have a "rotary" type coil, such as is described in U.S. patent application Ser. No. 444,465 filed on Nov. 24, 1982, and U.S. patent application Ser. No. 893,955 filed on Aug. 7, 1986, both assigned to the assignee of the present invention. The motor is used to swing the heads back and forth over the disks so as to access various of the tracks. The maximum acceleration and velocity of the heads across the disk is dependent upon the strength of the magnets used in the voice coil assembly and the amount of current transmitted to the coil.

The various tracks are identified through servo information located within each track or stored on a dedicated servo disk. The position of each of the heads is fixed relative to every other head so that by positioning a servo head over a particular track on a servo disk, each of the other heads will be located in a repeatable position.

The process of moving a head from a current position to a desired position is known as a "seek". To maximize the performance of a disk drive memory, it is desired to minimize the seek time. In the prior art, one method of minimizing seek time is to instantly bring the heads to a maximum acceleration so that there will be a linear increase in velocity up to a maximum or peak velocity. Approximately half way through the seek cycle, the heads are subjected to maximum deceleration resulting in a linear decrease in velocity until the heads come to a stop over the desired track.

One disadvantage associated with this method of performing seeks is the large amount of acoustical noise which accompanies the seek operation. To minimize acoustical noise, the prior art has either utilized acoustic damping material around the disk drive assembly, which has the disadvantage of adding to the weight, cost and size of the disk drive assembly, or it has slowed down current rise times by increasing the L/R time constant of the voice coil. This has the disadvantage of causing additional phase lag in the position loop which makes stablizing the loop more difficult.

Therefore, it is an object of the present invention to provide a method and apparatus for performing seeks which results in a reduction in accoustical noise, without additional phase lag.

It is a further object of the present invention to provide a method and apparatus of performing seeks which does not add to the time required for performing the seek.

It is yet another object of the present invention to provide a method and apparatus for performing seeks which can be adapted for use in a variety of disk drive systems.

It is a still further object of the present invention to provide a method and apparatus for performing seeks which can be utilized to perform other tasks in the disk drive system.

SUMMARY OF THE PRESENT INVENTION

Method and apparatus for performing track to track seeking on a hard disk drive memory is described. The present invention utilizes a gradual acceleration and deceleration profile to reduce the accoustical noise generated during seek operations. A seek profile is defined based on the starting position and desired ending position of the seek. Programmable parameters contained in the servo information are used in generating a seek profile. These parameters may be altered for different disk drive systems without the need to alter the control circuitry for performing the seek. In the present invention, a closed control loop is utilized for both performing seeks and for the control of track following (centering the head on a desired track). In addition to reducing the accoustical noise during seek operations, the present invention results in reduced settling times of the head at the end of a seek resulting in seek times equal to or less than those of conventional methods.

DETAILED DESCRIPTION OF THE PRESENT INVENTION

Method and apparatus for performing a seek in a hard disk drive memory system is described. In the following description, numerous specific details, such as tracks per inch, sample rates, frame configuration, etc. are set forth in order to provide a more thorough understanding of the present invention. It will be obvious, however, to one skilled in the art, that the present invention may be practiced without the use of these specific detail In other instances, well known circuits and structures have not been described in detail in order not to unnecessarily obscure the present invention.

It is possible to classify seek operations into one of three types as follows:

Class zero—seeks in which the head does not reach maximum acceleration.
Class one—seeks in which the head reaches maximum acceleration but not maximum velocity.
Class two—seeks in which the head reaches both maximum acceleration and maximum velocity.

Figure 1:
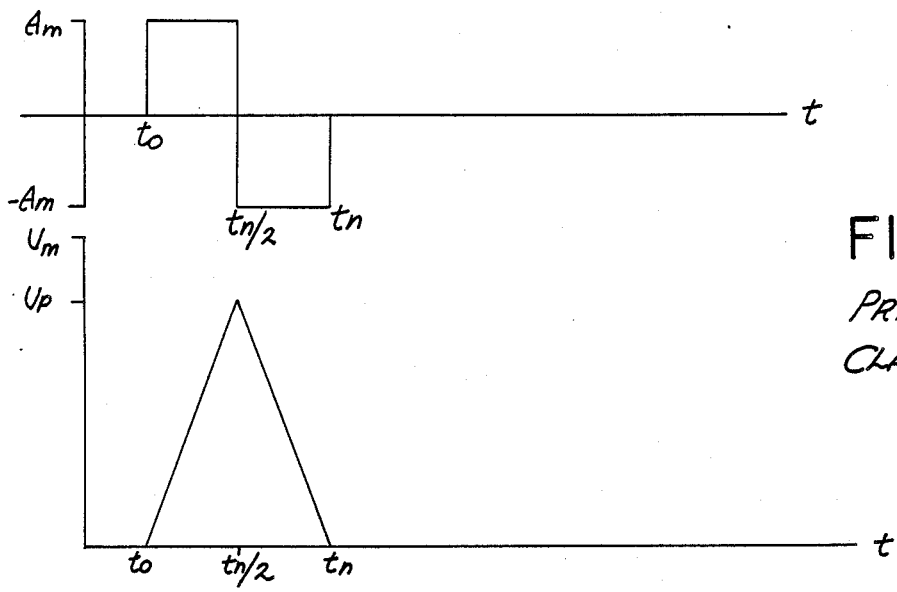
FIG. 1 is a graph illustrating prior art acceleration and velocity profiles for a class one seek.
Figure 2:
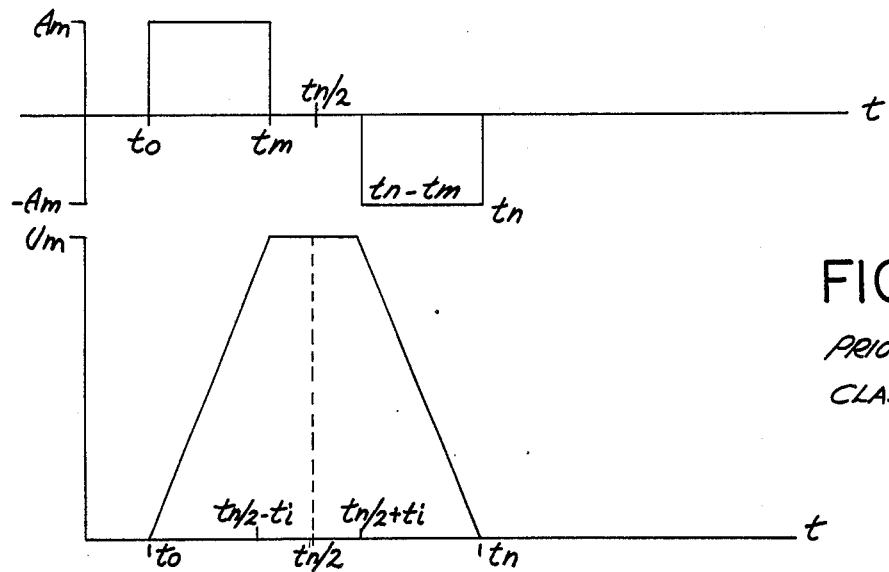
FIG. 2 is a graph illustrating prior art acceleration and velocity profiles during a class two seek.

A seek profile is the acceleration or velocity of the head plotted versus time. Examples of prior art acceleration and velocity seek profiles for class 1 and 2 are illustrated in FIGS. 1 and 2. The prior art does not utilize a class 0 seek since the head is always subjected to maximum accelleration.

Referring to FIG. 1, the acceleration and velocity profiles for a prior art class one seek are shown. In a class one seek, the head is subjected to maximum acceleration Am at time t0. This acceleration is maintained until the velocity reaches a peak value Vp which is less than maximum velocity Vm. This occurs at time tn/2. The head is then subjected to maximum deceleration, −Am, until time tn at which time the deceleration is instantaneously brought back to zero.

A class two prior art search is illustrated in FIG. 2. At time t0, the head is subjected to instantaneous maximum acceleration Am. This acceleration is held until the head reaches maximum velocity Vm at time tm, where tm is the length of time required to reach maximum velocity. In this example, the maximum velocity is held until tn−tm at which time the head is subject to maximum deceleration −Am so that the velocity linearly decreases to zero at time tn. For each class of seek, the acceleration and velocity profiles are symmetrical about time tn/2.

The velocity profiles illustrated in FIGS. 1 and 2 are ideal profiles in which velocity reaches zero at time tn. In reality, the head in prior art seek methods undergoes a "settling time" caused by excessive vibration of the head due to the hard braking effect of maximum deceleration and the response time lag of the track following loop when control is shifted from the velocity loop to position loop. This residual vibration must settle out before the head can be properly positioned over a desired track. This settle time adds to the total time of the seek. In addition, as previously noted, prior art seek methods result in high levels of acoustic noise generally believed to result from vibration introduced to the actuator assembly as a result of the instantaneous acceleration and deceleration.

Figure 4:
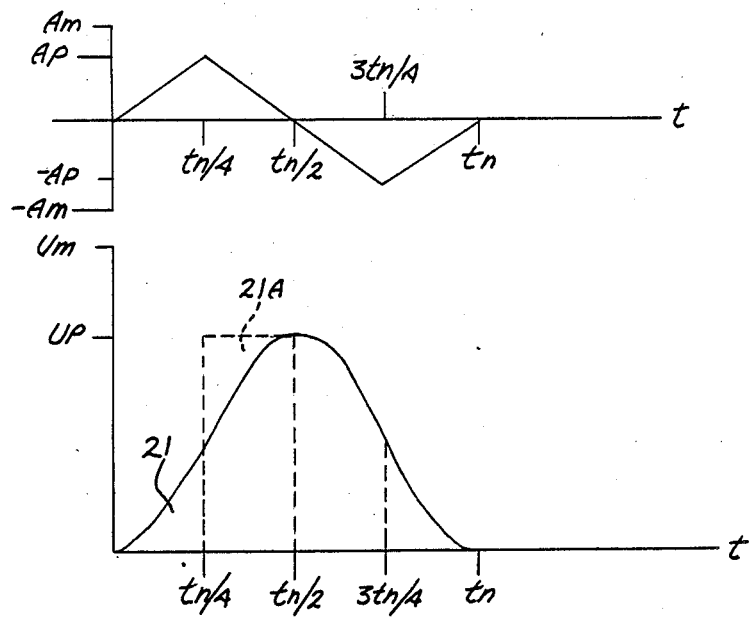
FIG. 4 is a graph illustrating the acceleration and velocity profile of the present invention for a class zero seek.
Figure 5:
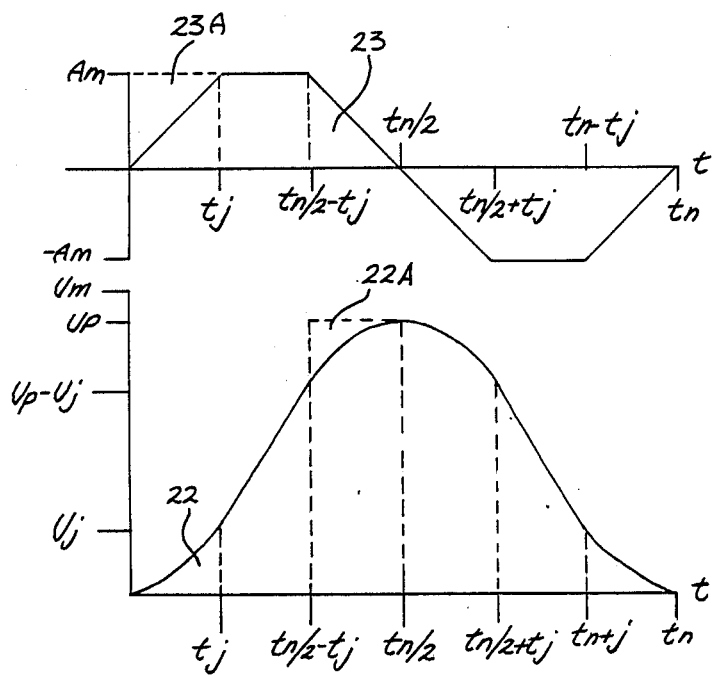
FIG. 5 is a graph illustrating acceleration and velocity profiles of the present invention for a class one seek.
Figure 6:
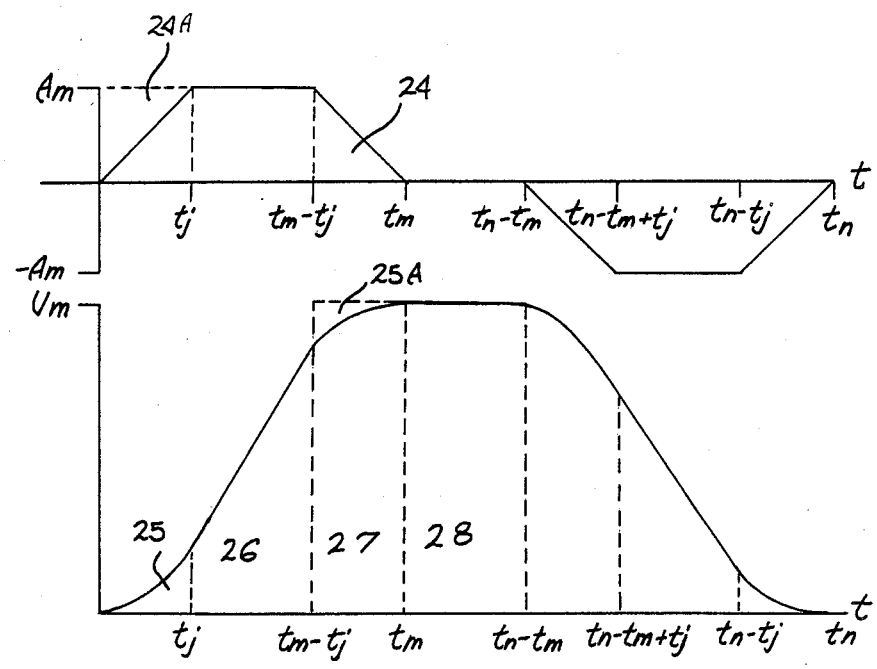
FIG. 6 is a graph illustrating acceleration and velocity profiles of the present invention for a class two seek.

The present invention avoids the introduction of vibrations into the head by utilizing a gradual acceleration profile as shown in FIGS. 4 through 6. It avoids the settle time required to switch from the velocity to position control by keeping the position loop closed at all times, no velocity loop is needed. For purposes of the following description, the following definitions will apply:

$tn$ = total time to perform a seek
$Xn$ = length of the seek
$tj$ = the time to achieve maximum acceleration
$tm$ = the length of time to achieve maximum velocity
$Ap$ = peak acceleration during a seek
$Am$ = maximum acceleration during a seek
$Vp$ = peak velocity during a seek
$Vm$ = maximum velocity during a seek
$J$ = the rate of increase in acceleration
$Xc1$ = the seek distance marking the boundary between a class zero and class one seek
$Xc2$ = the length of seek marking the boundary between a class one and class two seek.
$tcal$ = the maximum time of constant acceleration during a class one seek A class zero seek is illustrated in FIG. 4. In the present invention, the acceleration of the head is gradually increased until it reaches a peak acceleration Ap at time tn/4. The acceleration of the head is then gradually decreased until at time tn/2 it is at zero. The deceleration of the head is then gradually decreased until it reaches −Ap at time 3tn/4. The deceleration is then gradually brought to zero at a constant slope profile until it reaches zero at time tn. This acceleration profile results in a velocity profile as shown in FIG. 4, following a curved line of constantly increasing slope until time tn/4 and constantly decreasing slope until time tn/2 at which point it has reached a peak velocity Vp which is less than maximum velocity Vm. Between time tn/2 and 3tn/4 the velocity is a curved line of constantly decreasing slope. Between time 3tn/4 and tn the velocity profile is a curve of increasing slope.

Referring to FIG. 5, a class one acceleration and velocity profile of the present invention is shown. The head is gradually accelerated following a constant slope profile until time tj at which time maximum acceleration Am is reached. Maximum acceleration is maintained until time tn/2−tj when the acceleration is gradually decreased until it is zero at time tn/2. This results in velocity profile following a curved line of increasing slope until time tj, a constant slope increase between time tj and tn/2−tj and a gradually decreasing sloped curved line between tn/2−tj and tn/2.

The head is then gradually decelerated to maximum deceleration −Am. Maximum deceleration is maintained for a period of time and then the deceleration is gradually decreased until it reaches zero at time tn. The velocity profile is symmetrical about tn/2.

FIG. 6 illustrates a class two seek profile utilizing the present invention. In this case maximum acceleration is reached and maintained and maximum velocity Vm is obtained by the heads and maintained for a period of time before gradual deceleration occurs.

It has been found that by using the seek profile of the present invention acoustic noise is significantly reduced without the need for acoustic damping material. In addition, utilizing the present invention, a significantly reduced settling time results so that the total seek time is equal to or less than the seek times of prior art methods.

Figure 3:
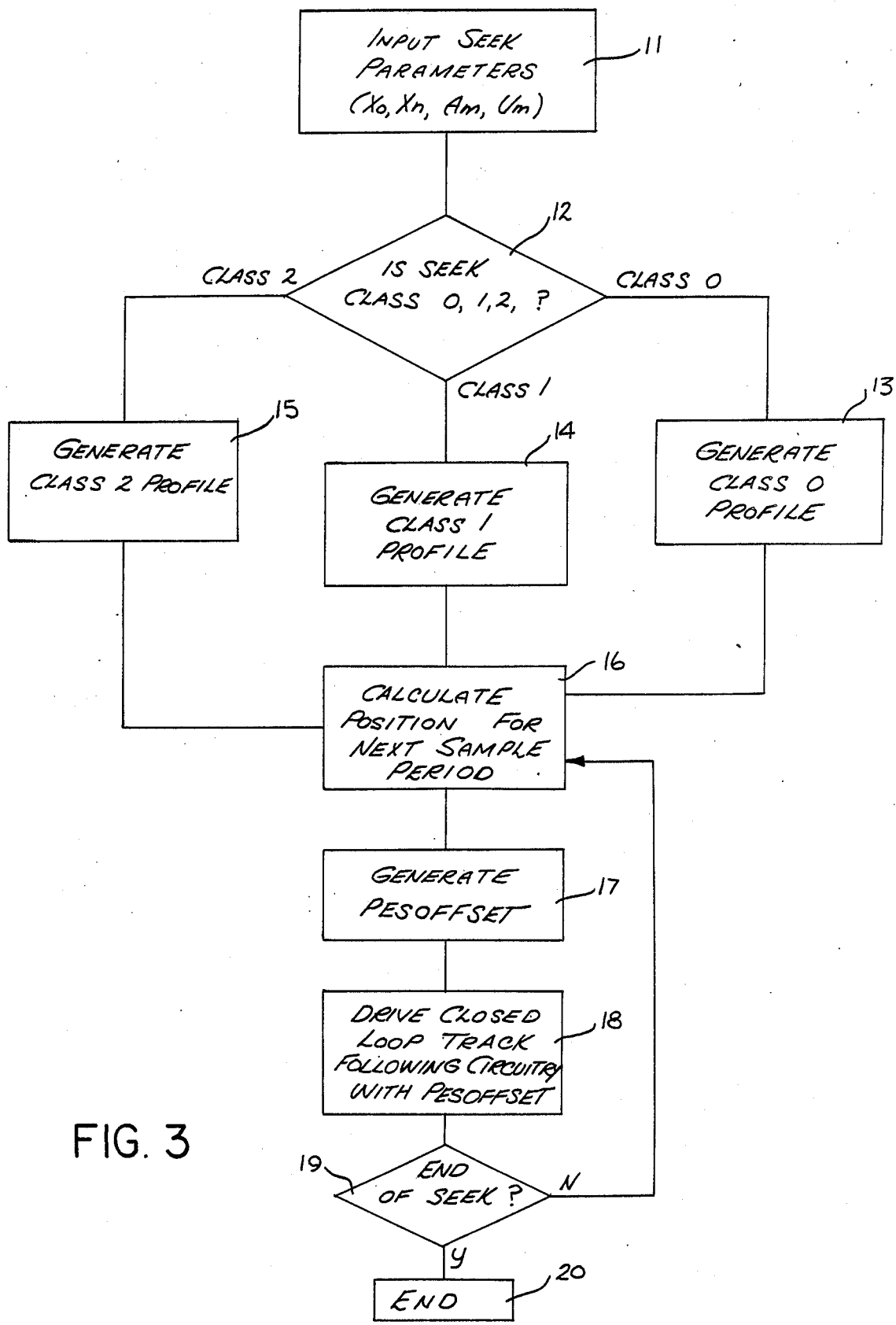
FIG. 3 is a flow chart illustrating the method of the present invention.

FIG. 3 is a functional block diagram of the present invention. Prior to conducting a seek, the seek parameters are inputted to a microprocessor as shown by step 11. The seek parameters include starting position X0 and ending position Xn, maximum acceleration Am, maximum velocity Vm, as well as a number of other parameters described in detail below. Utilizing the seek parameters, the microprocessor determines in step 12 if the seek is class zero, one or two. If it is a class zero seek, the microprocessor generates a class zero profile indicated by step 13. If it is a class one seek, a class one profile is generated as shown by step 14. At step 15, a class two profile is generated if the seek is a class two seek.

After the seek profile has been determined, the position of the head is calculated for the next sample period as shown at step 16. In step 17, the desired position is used to generate a position error signal offset (PES-OFFSET) and current offset (IOFFSET). At step 18, the PESOFFSET and IOFFSET signals are used to drive a closed loop track following circuit. The circuit generates a control signal to the voice coil which controls the acceleration of the heads.

After each sample period, the system determines if the seek ended. If it is not ended, step 16, 17 and 18 are repeated. If the seek is over, the seek process ends.

There are three unique algorithms used to generate the seek profile, one algorithm for each seek class. The algorithms are determined as follows:

CLASS ZERO

For each class of seek we will assume that the acceleration is a linear function, rather than a step function as in prior art methods. Therefore, the acceleration at any time t will be given by $A(tn)=Jt$ where J=the increase in acceleration per time sample and t=the number of samples.

Referring to FIG. 4, the distance moved during the seek is equal to the area under the velocity curve (the integral of velocity being equal to distance). Since the area labeled 21 is equal to the area labeled 21A, and the velocity curve is symmetrical about tn/2, the area (distance) is given by:

$$Xn=2(tn/4)(Vp)=tn\ Vp/2.$$

Velocity is the integral of acceleration and peak velocity is reached at tn/2 so that:

$$Vp=(\tfrac{1}{2})(tn/2)Ap$$

$$Ap=Jtn/4$$

$$Vp=Jtn^2/16$$

Thus:

$$Xn=Jtn^3/32$$

And:

$$Tn=\sqrt[3]{32Xn/J}$$

In the present invention, J is a fixed value written on the servo surface and Xn is the number of tracks between the present track and the desired track. Thus the time tn of the seek can be determined along with the peak velocity Vp and peak acceleration Ap. Therefore, for a class 0 seek, the profile can be easily generated.

A seek will remain in class zero until that time when Xn is sufficiently long enough that maximum acceleration will just be reached. As seen in FIG. 5, maximum acceleration Am is reached at time tj. For the longest class zero seek, $tn/4=tj$ so that $tn=4\ tj$. Thus, if we define Xc1 as the distance at which a class one seek begins, $Xc1=J(4tj)^3/32$.

Thus:

$$Xc1=J64tj^3/32=2\ J\ tj^3=2\ tj^2Am.$$

For each disk drive, tj and Am will be known quantities and thus a boundary between class zero and class one seeks can be defined. When a seek is requested, if the seek length is less than $2\ tj^2\ Am$, a class zero seek profile will be generated. If the seek length is greater than $2\ tj^2\ Am$ a class one or class two seek profile will be generated.

CLASS ONE

Referring to FIG. 5, we can determine the distance (number of tracks) of a class one seek by finding the area under the velocity curve. Since area 22 is equal to area 22A, the slope of the velocity curve between tj and $tn/2-tj$ is constant, and since the curve is symmetrical about tn/2, the area under the curve is given by:

$$Xn=2[\tfrac{1}{2}][tn/2-2\ tj][Vj+(Vp-Vj)]+[tj\ Vp]$$

$$Xn=(tn/2-2tj+2tj)Vp$$

$$Xn=(tn/2)Vp$$

The peak velocity Vp is equal to the area under the acceleration curve at time tn/2. Since the area 23 is equal to area 23A, peak velocity Vp is given by:

$$Vp=Am(tn/2-tj);$$

$$Am=J\ tj$$

$$Vp=J\ [tn\ tj/2-tj^2]$$

Xn is thus given by:

$$Xn=J[tn^2(tj/4)-tn\ (tj^2/2)]$$

Solving for tn we find:

$$tn=tj+\sqrt{tj^2+4Xn/Jtj}$$

The boundary between class one and class two seek appears at the point where Vm is first achieved. The length of the seek is designated Xc2. tm is the point at which Vm is first achieved and where Vm=Vp. At the boundary between a class one and class two seek, Tm is equal to tn/2, and thus tn=2 tm. Vm is equal to the area under the velocity curve of FIG. 6 at time tn. Since area 24 is equal to area 24A, then:

$$Vm=Am\ (tm-tj)$$

tm is thus $=[Vm/J+tj^2]/tj$ $$tm=Vm/[Jtj]+tj$$

$$tm = Vm/Am + tj$$

$$tm = [Vm + Am\ tj]/Am$$

Solving for Xc2 we find:

$$Xc2 = tn/2Vm.$$

Since $tn/2 = tm$, $Xc2 = tmVm$ $$Xc2 = [Vm + Am\ tj]/Am(Vm)$$

$$Xc2 = [Vm^2 + VmAmtj]/Am$$

For a particular disk drive, tn, Am and tj are known parameters and Vm may thus be calculated. Thus, the boundary between a class one and class two seek can be easily calculated.

CLASS TWO

Referring to FIG. 6, the distance Xn of a class two seek is equal to the area under the velocity curve. This area is given by area 28 plus twice the areas 25, 26 and 27. Since area 25 is equal to area 25A, then:

$$Xn = 2[\tfrac{1}{2}(tm - 2tj)(Vj + Vm - Vj) + tjVm] + (tn - 2tm)\cdot Vm$$

As noted previously, $tm = Vm/Am + tj$. Thus:

$$Xn = [(Vm + J\ tj^2)/(Jtj^2 - 2tj + 2tj]Vm + [tn - 2)(Vm + Jtj^2)/(Jtj))]Vm$$

$$Xn = [tn - (Vm + J\ tj^2)/(Jtj)]Vm$$

$$Xn = Vm[tn - (Vm/Jtj) - tj] = tnVm - Xc2$$

Therefore, $tn = (Xn + Xc2)/Vm$.

Therefore, once Xn is determined, the class of seek will be known by comparing it to the boundary points for that particular disk drive system. tn may then be calculated for that class of seek and the timing points and peak velocities and acceleration may be determined for the particular profile to be followed.

PROFILE GENERATION

In operation, a host computer controls and generates the seek request of the hard disk drive of the present invention. A seek request is inputted to a microprocessor of the present invention. In the present invention, an Intel 8096 sixteen bit microprocessor is utilized. However, any appropriate microprocessor may be utilized in the present invention.

Seek requests generated by the host computer include the desired ending track Tn of the seek. The processor has the present track Tp stored in memory. The number of tracks between Tp and Tn is Xn, the length of the seek. The proccessor then compares Xn with boundary values Xc1 and Xc2 to determine the class of seek required. Once the class of seek is determined, the line required for the seek tn, the peak velocity Vp and peak acceleration Ap are computed.

In the preferred embodiment of the present invention, fixed parameters for the disk drive are stored on a servo disk and read into the microprocessor on powerup of the disk drive. Such information as tj, tm, J and $\sqrt[3]{32/J}$ are stored in the servo information.

By way of example, the steps taken in generating a profile for a class two seek are discussed. The microprocessor, after determining that Xn for the particular seek is greater than Xc2, determines the total length of time of the seek tn. For the class two seek, tn is given by:

$$tn = (Xn + Xc2)/Vm.$$

For a class two seek, the initial portion of the profile is always the same. A constant slope acceleration to maximum acceleration Am from time t0 to time tj. Constant acceleration at Am from time tj to time tm−tj and a gradual constant slope deceleration from Am to zero between time tm−tj and time tm.

The only real variable in a class two seek is the amount of time spent at constant velocity Vm. Referring to FIG. 6, we see that constant velocity occurs between time tm and time tn−tm Having previously solved for time tn, we can simply subtract tm to find the point at which constant velocity will end. The remainder of a class two seek is simply the mirror image of that portion of the seek between time t0 and time tm. A constant slope deceleration between time tn−tm and time tn−tm+tj. Maximum deceleration −Am is then maintained between time tn−tm+tj and time tn−tj. Deceleration is gradually decreased to zero between time tn−tj and time tn.

The microprocessor utilizes the acceleration profile to generate the desired position of the head at each of a plurality of time samples. As will be explained in detail, this position information is used to drive the voice coil of the disk drive to the heads in a manner approximating the desired seek profile.

In the preferred embodiment of the present invention, the microprocessor generates a number of values to aid in defining the profile of the seek. As previously noted, Xn is generated by subtracting the current track position from the desired track position. Xn thus represents a number of tracks.

J is the incremental acceleration and is configured as number of tracks per time sample squared per time sample. In the preferred embodiment, J is 1/4096th of a track per time sample squared per time sample. tn can thus be calculated for each class of seek and the appropriate timing positions for transitions in the seek profile determined accordingly.

In a class one seek, there is a period of constant acceleration and one of constant deceleration. Calling this time tca1 for a class one seek, then:

$$tca1 = tn/2 - tj.$$

In the preferred embodiment of the present invention, tj is 64, i.e. it takes 64 time samples to reach maximum acceleration. However, any suitable length of time may be utilized.

In a class two seek, the periods of constant acceleration and deceleration are fixed and are each given by:

$$tca2 = tm - 2tj.$$

Where tm is the number of time samples required to reach maximum velocity.

A class two seek also has a period of constant maximum velocity, tcm, where:

$$tcm = tn - 2tm.$$

POSITION INFORMATION

Position information comes from the servo tracks. Each track on the servo disk of the present invention is divided into a plurality of "frames". In the preferred embodiment there are 3776 frames per servo track. However, any suitable number of frames per track may be utilized without departing from the scope of the present invention.

Figure 7:
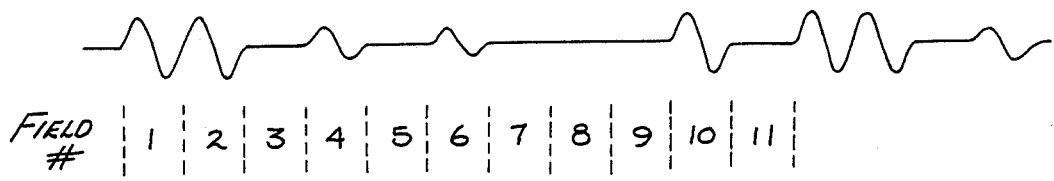
FIG. 7 is a timing diagram illustrating a servo frame of the present invention.

Each frame provides a sample of the current head position for that moment in time. A servo frame is illustrated in FIG. 7. The frame consists of 11 fields. Each field is either empty or contains a dibit.

Field number 1 is a servo data bit field. If a dibit is present, field number 1 is a "1". The absence of a dibit is a "0". Since in the preferred embodiment, there are 3776 frames per revolution, decoding this bit in each frame allows 3776 bits or 236 16 bit words to be read from each servo track.

Field number 2 is a sync bit field. This field always has a dibit contained within it. Thus, each frame of every track has a sync bit. This is used for synchronization purposes. Fields one and two are the only adjacent fields that can both contain die bits. All other dibits are separated by at least one empty field. This fact is used to distinguish the sync bit location from the other dibits in the frame.

Field numbers 3, 5, 7, 9 and 11, are empty fields used for separating the position data fields from each other and from the data bit and sync bit fields.

Field numbers 4, 6, 8 and 10 are position data fields a, b, c, and d respectively. These fields contain the dibits that are used for determining head position. Even number tracks use fields a and b (4 and 6) while odd number tracks use fields c and d (fields 8 and 10).

The data words of a track provide information regarding the particular drive involved. For example, the type of drive, the index location of the track, maximum acceleration, tj, tm, etc. By utilizing the data fields, variables can be changed for different disk drives, allowing the same software to be used regardless of the application. In addition, the data field can contain information such as strength of magnets or the amount of current needed based on the strength of magnets and number of turns in a voice coil to provide a certain amount of acceleration. If the strength of the magnet is changed, of the number of turns in the voice coil is changed, that information can be changed so that accurate acceleration can still occur.

In the preferred embodiment of the present invention, the servo pattern utilized is a quadrature dibit. By way of example, if the head is over a even number track, one side of the head will be picking up "a" signals and the other side will be picking up "b" signals. If the head is exactly centered between the a and b tracks, the peak values of the a and b signals will be equal. By subtracting a from b (or vice versa if desired) it is possible to determine if the head has drifted to one side or the other. For example, if the difference between a and b is positive the head will be more on the a side than the b side. If it is negative the head will be more towards the b side. For odd numbered tracks, the c and d signals are utilized.

FIGURES 8 THROUGH 14

Following is a detailed description of the apparatus employing the method described above.

Figure 12:
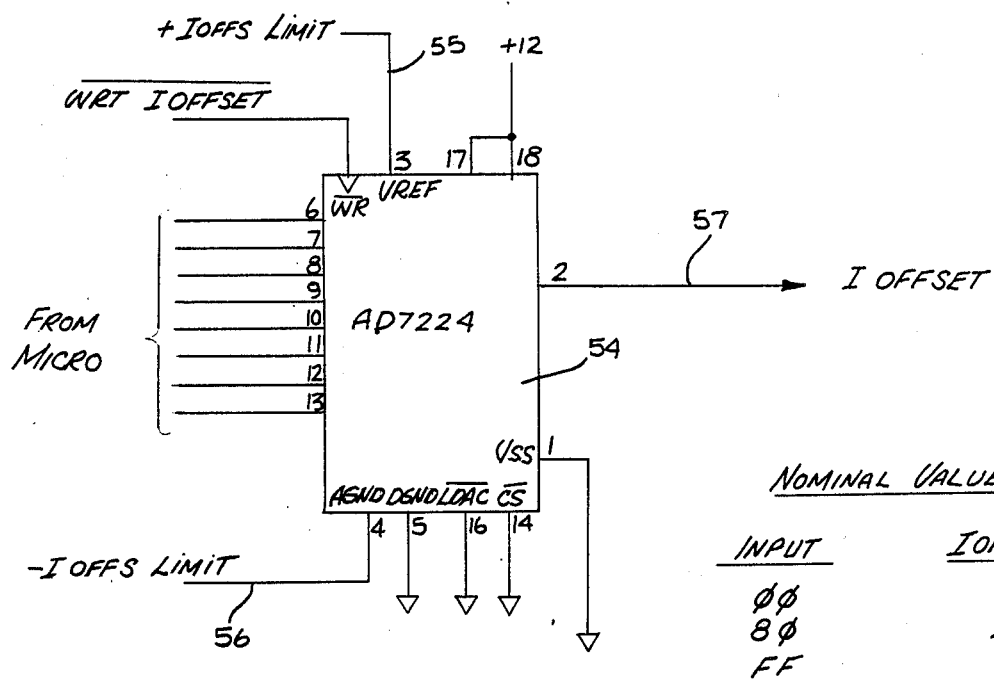
FIG. 12 is an electrical schematic illustrating the IOFFSET of the present invention.
Figure 13:
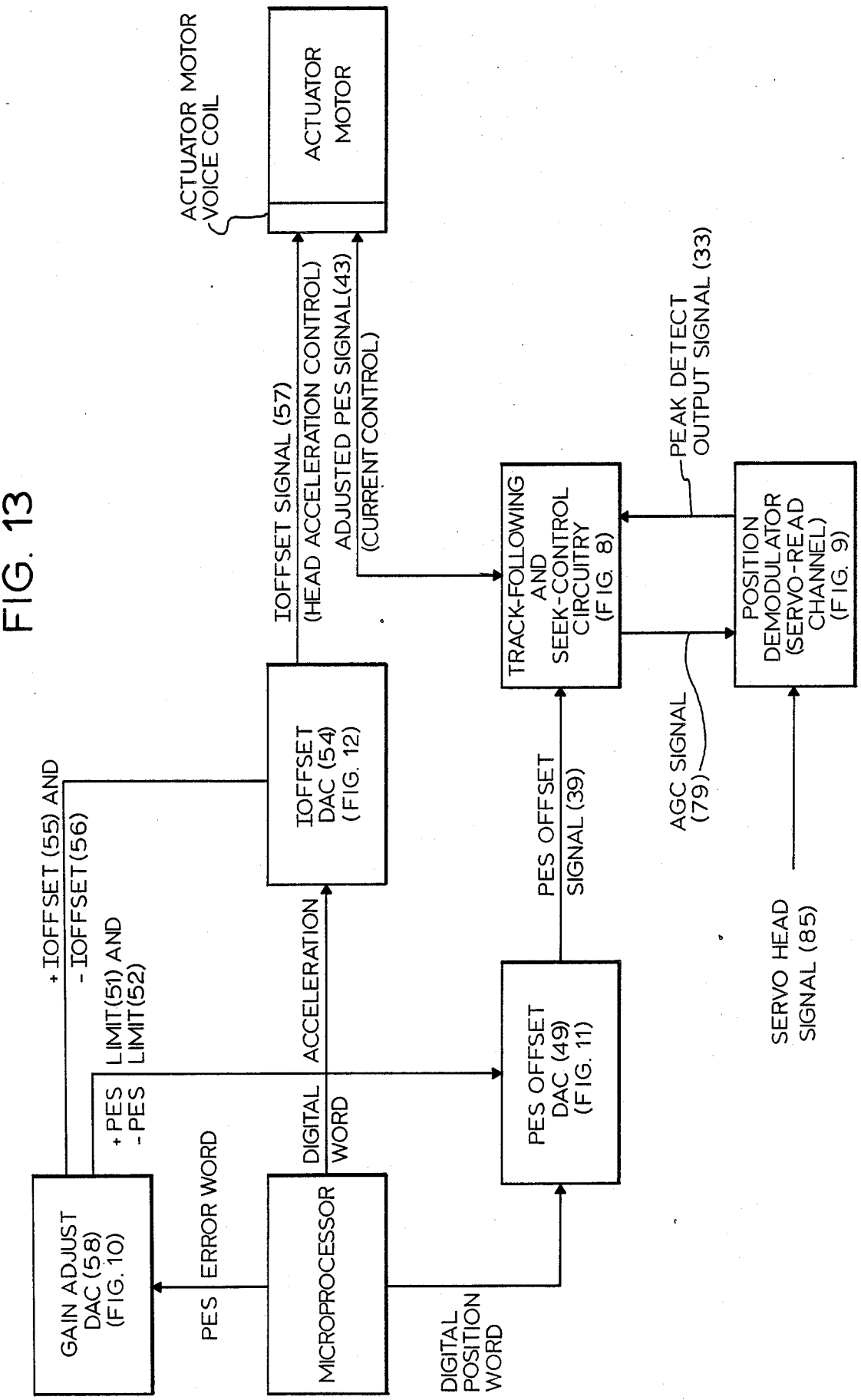
FIG. 13 is a block diagram of the present invention.

FIG. 13 shows an overview of the invention. The microprocessor provides a position error signal (PES) error word to gain adjust digital-to-analog converter (DAC) 58, described in the discussion of FIG. 10 below. DAC 58 in turn is coupled to IOFFSET DAC 54, providing it with the upper and lower IOFFSET limits, 55 and 56. DAC 54 is described in the discussion of FIG. 12, below. DAC 54 has a second input, from the microprocessor: a digital acceleration word, which when combined with the IOFFSET limits, produces the acceleration control for the head. This acceleration control signal 57 is coupled directly to the voice coil of the actuator motor.

The PES offset DAC 49, described in the discussion of FIG. 11 below, is a third element receiving input from the microprocessor. The microprocessor provides a digital position word, which is combined with a second input from DAC 58 comprising the upper and lower position error signal limits, 51 and 52. DAC 49 outputs a PES offset signal 39, which is coupled to control circuitry described in the discussion of FIG. 8 below. The control circuitry provides the second input to the actuator motor voice coil, this input determining the current used to move the head. The control circuitry is also coupled to the servo-read channel described in the discussion of FIG. 9 below, providing it with an automatic gain control (AGC) signal 79. In turn, the servo-read channel provides the control circuitry with a peak detect output signal 33. A second input to the servo-read channel is servo-head signal 85.

Figure 14:
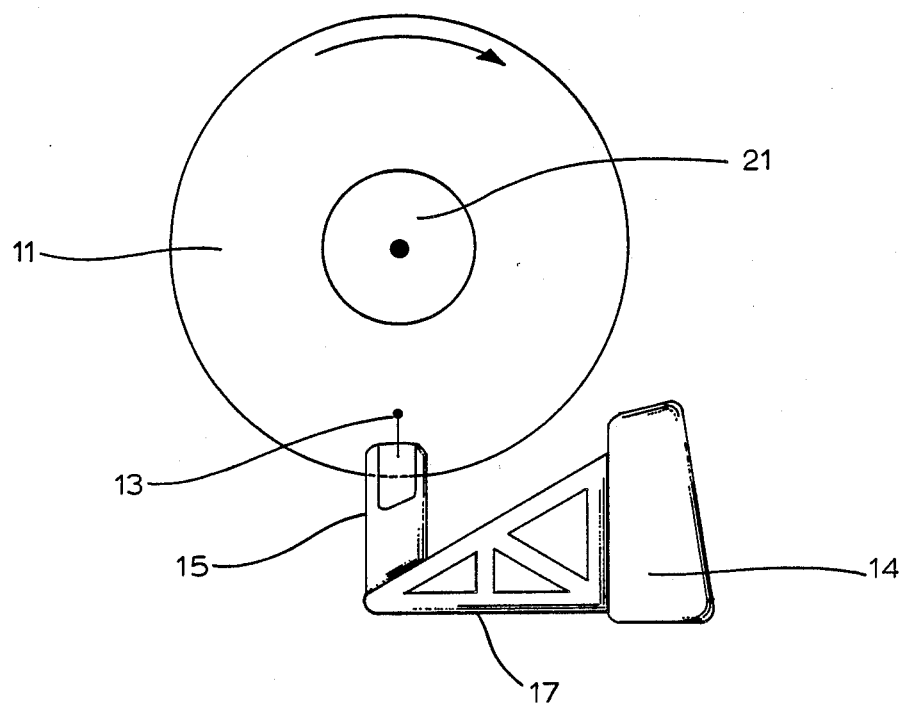
FIG. 14 is a top view of a representative disk drive such as may be used with the present invention.

FIG. 14 shows the top view of a disk drive with a rotating disk 11, magnetic head 13, slider 15, swing arm 17, actuator motor 19, and center spindle 21.

TRACK FOLLOWING CONTROL LOOP

Figure 8:
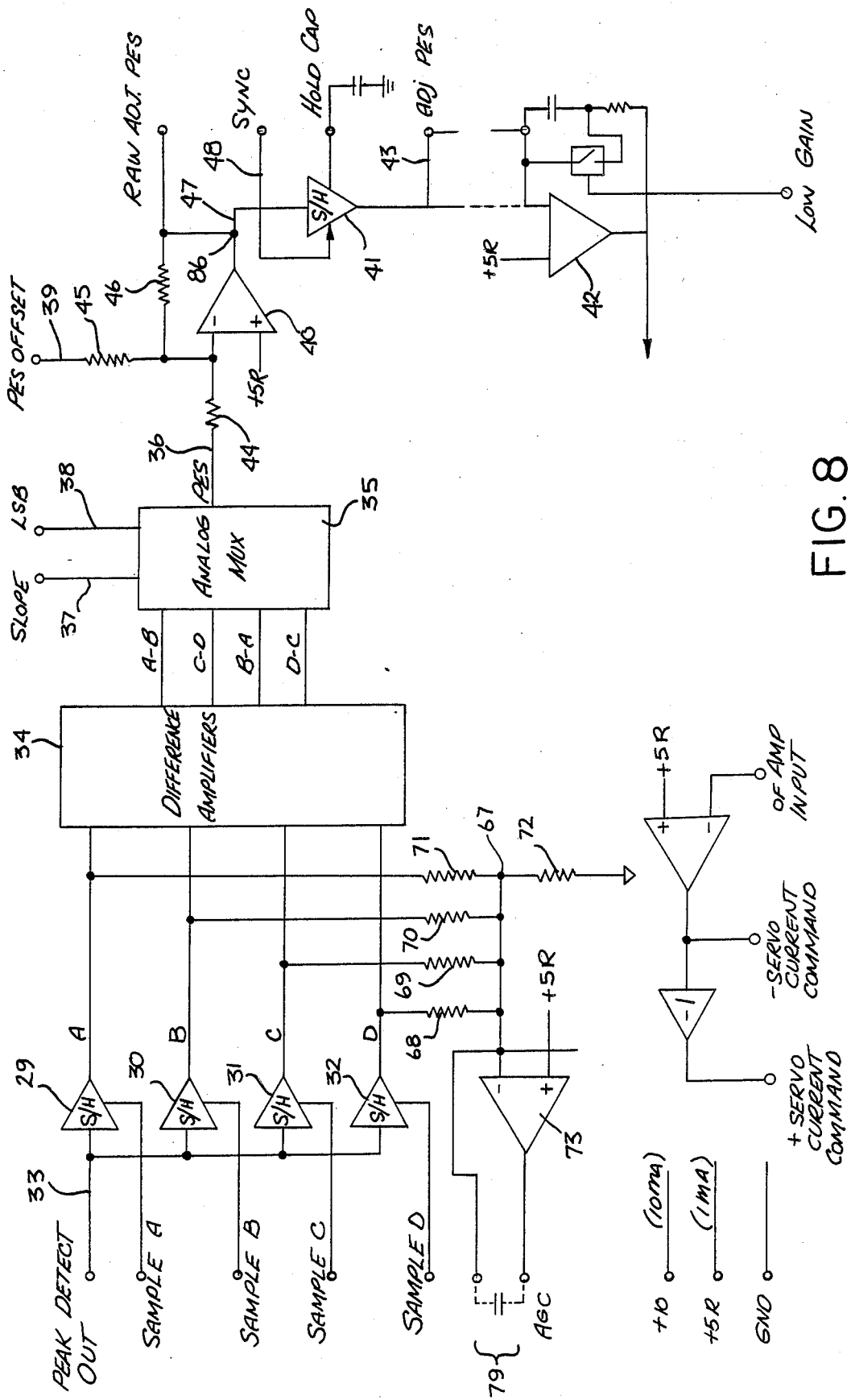
FIG. 8 is an electrical schematic illustrating the control circuitry of the present invention.

FIG. 8 illustrates the track following circuitry of the preferred embodiment of the present invention. As previously noted, the track following circuitry is utilized both to center the head over a particular track and to position the heads during a seek profile.

The track following and seek control circuitry is illustrated in FIG. 8. A peak detect output signal is coupled to the inputs of sample and holds (s/h) 29–32. A sync pulse for s/h 29–32 is provided by samples a–d respectively. The outputs of s/h 29–32 are coupled to difference amplifiers 34 which output the differences between sample pairs a and b and c and d (d-b, b-a, c-d, d-c). The output of amplifier 34 is coupled to analog multiplexor (MUX) 35. Also inputted to MUX 35 are slope signal 37 and LSB 38. The output of MUX 35 is a position error signal (PES) 36 which is coupled to operational amplifier 40. Also coupled to the inverting input of op amp 40 is PES offset signal 39. The output of op amp 40 coupled to s/h 41. The output of s/h 41 is an adjusted PES signal 43. The signal is coupled to operational amplifier 42 whose output is used to control the current supplied to the voice coil of the present invention.

The output of sample and hold 41 is the adjusted PES signal, 43. The adjusted PES signal 43 is coupled to the voice coil of the actuator motor along with an IOFFSET signal 57. The IOFFSET signal is generated by the microprocessor and is coupled to the voice coil to achieve the desired acceleration during the next time sample. The combination of the IOFFSET signal and adjusted PES signal 43 results in the voice coil moving the head to the proper track and the proper position within that track.

The peak detect output signal 33 is generated by the servo read channel of the magnetic head of the present invention. This peak detect output signal 33 is coupled to the input of each of the s/h 29–32. As noted previously, sync pulse for each s/h 29–32 is supplied by sample a–d signals respectively. The sample signals are synchronized so that when a peak is detected on frame 4 (channel a), s/h 29 will receive a sync pulse so that an output a is generated from s/h 29 and inputted to difference amplifiers 34. Likewise, when a peak in field 6 is detected, sample b will supply a sync pulse to s/h 30 so that an output b may be inputted to difference amplifiers 34. A peak detect for field 8 and 10 will provide c and d outputs from amplifiers 31 and 32 respectively. The difference amplifiers have four outputs as follows, a - b; c - d; b - a; and d - c. The polarity and magnitude of these signals are used to determine whether the heads are off to the left or right of the center of the track.

The output from amplifier 34 is inputted to analog MUX 35. The slope 37 and LSB 38 are the two least significant bits of the track number presently accessed by the head. For example, the two least significant bits of track zero are 00, of track one, 01, for track two, 10, and for track three, 11. Each fourth track (track one, five, nine, etc.) has the same two least significant bits.

The output of MUX 35 is a position error signal (PES) 36 which represents the amount that the head is off the center of the track. PES 36 is used by the control loop of the track following circuitry to keep the head on the center of the desired track. In the present invention, however, the track following control loop is also utilized to control seek operations.

The PES signal 36 is coupled, through resistor 44, to the inverting input of operational amplifier (op amp) 40. A second signal, the PES offset signal 39, is coupled through resistor 45 to the inverting input of op amp 40. The output of op amp 40 is coupled through resistor 46 and feedback loop to the inverting input.

As noted before, the PES signal 36 represent the distance from the actual position to the center of the track that the head is currently accessing. The PES offset signal 39 represents the negative of the desired difference from the current position to the track center. The output of amplifier 40 is raw adjusted PES 47, representing the difference between the current position and desired position in the profile.

The microprocessor generates an appropriate PES offset signal for each desired position of the head during the seek at each time sample. By utilizing the track following circuitry to control the seek operation, it is not necessary for the microprocessor to monitor the actual position of the head during the seek and readjust the PES offset signal. If there is some error in actual acceleration from predicted acceleration, the position error signal 36 will start to build up, causing additional current to be put on the actuator voice coil by the track following circuitry which will serve to bring the acceleration in line with the desired profile.

In the preferred embodiment of the present invention, the PES offset signal 39 is updated every 8 frames. It will be obvious, however, to one skilled in the art, that the PES offset signal can be updated at any suitable rate. The output 47 of op amp 40 is coupled to s/h 41. A synchronizing signal on line 48 coupled to s/h 41 closes s/h 41 every 8 frames. Thus, the output 43 of s/h 41 occurs every 8 frames although the PES signal 36 is being updated each frame. The output of s/h 41 will only occur for a valid PES offset value which occurs every 8 frames.

In order to further simplify the operation of the track following circuitry, the present invention provides adjustments to compensate for actual operating conditions of the disk drive. As noted before, the field data on the servo disk provides information regarding acceleration, maximum velocity, etc. However, there are some factors which may vary from drive to drive or over time. For example, the PES offset signal is a voltage which is used along with the IOFFSET signal, to drive the head the desired distance during the sample time. The number of volts per unit distance required is inversely portional to the effective width of the head. The head width may be affected by the flying height of the head over the disk as well as the skew of the head.

Therefore, on startup, the microprocessor determines the effective head width. From the field data, the microprocessor knows the number of tracks per inch (TPI) and also establishes a sample rate. In order to determine effective head width, the microprocessor moves to the edge of a track using the PES OFFSET signal. The microprocessor then switches to track following on the adjacent track on the same edge as before. The adjusted PES signal is then monitored to check for any position errors. Adjustments are made until no error in adjusted PES is seen when switching tracks in this manner.

In addition to variation in head width, the performance of the actuator motor may vary based o tolerances of magnets used in the actuator motor. A confirmation seek is performed with the PES compared to an optimal value. The error between the actual and optimum can be used to adjust the torque constant of the actuator motor. The microprocessor may then compensate for the effective head width and torque constant of the actuator motor and obtain very predictible seeks. Any remaining error will be corrected by the magnitude of the PES signal 36. As a result, there is no need for the microprocessor to be part of the closed loop process during seeks.

POSITION DEMODULATOR

Figure 9:
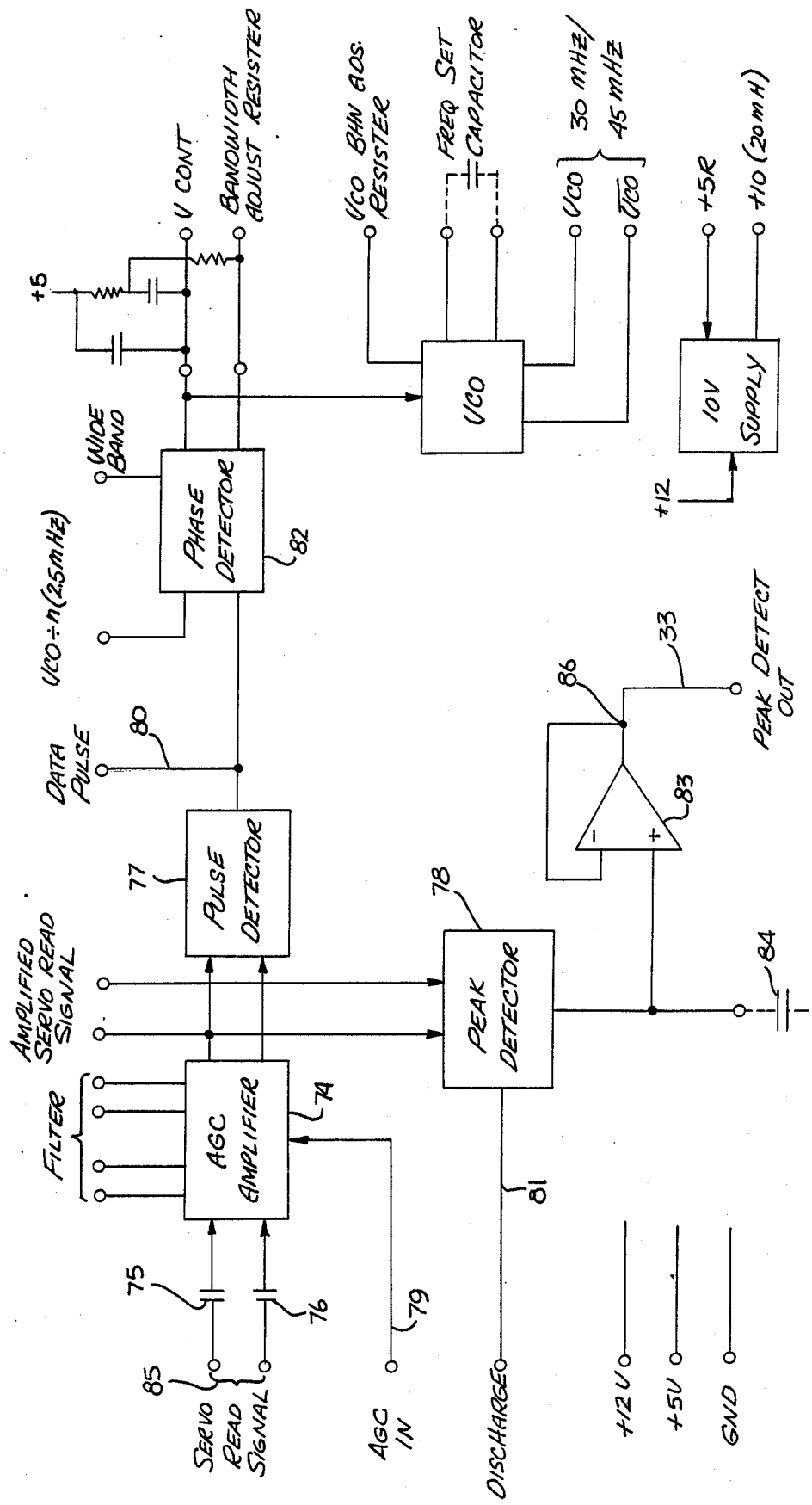
FIG. 9 is an electrical schematic illustrating the servo read channel of the present invention.

The position demodulator is illustrated in FIG. 9. The servo head signal 85 is inputted through capacitor 75 and 7 to the automatic gain control (AGC) amplifier 74. The gain of the AGC amplifier 74 is controlled by the AGC signal 79. The output of the AGC amplifier 74 is coupled to a pulse detector 77 and to a peak detector 78. Each time a peak is detected, the output of the peak detector 78 charges holding capacitor 84. The output of the peak detector is also coupled to the non inverting input of op amp 83. The inverting input of op amp 83 is coupled to the output of op amp 83 at node 86. The signal at node 86 is the peak detect out signal 33. Just prior to sampling each signal, the peak detector is 78 is discharged through discharge line 81. In this manner, if the new peak sample being inputted is lower than the previous peak sample, the peak detector 78 will be able to detect that the new lower peak value. The pulse detector 77 generates a digital pulse for each frame. The output of pulse detector 77 and a data pulse signal 80 are inputted to phase detector 82.

The peak to peak signals being measured on any particular track may vary in magnitude. The object of the peak detect circuitry and track following circuitry is to determine the percentage difference in amplitude between adjacent channels. Obviously a 10% difference in amplitude will be a larger number in terms of absolute voltage at a 10 volt peak to peak magnitude then it is at a 1 volt peak to peak magnitude. In order to guarantee that on whatever track the head accesses, the peak to peak amplitude of the signal being sampled will stay constant, the outputs are summed. As shown in FIG. 8, these outputs are summed at summing node 67 through resistors 68-71. A pull down resistor 72 is also coupled to node 67 and sets the current resistor 68-71. When the currents through the 4 resistor 68-71 are not equal to the current through resistor 72, the integrator 73 ::ill charge up or down and change the gain control of the read channel. The output of integrator 73 is coupled to AGC amplifier 74 of FIG. 9.

PES OFFSET DAC

Figure 11:
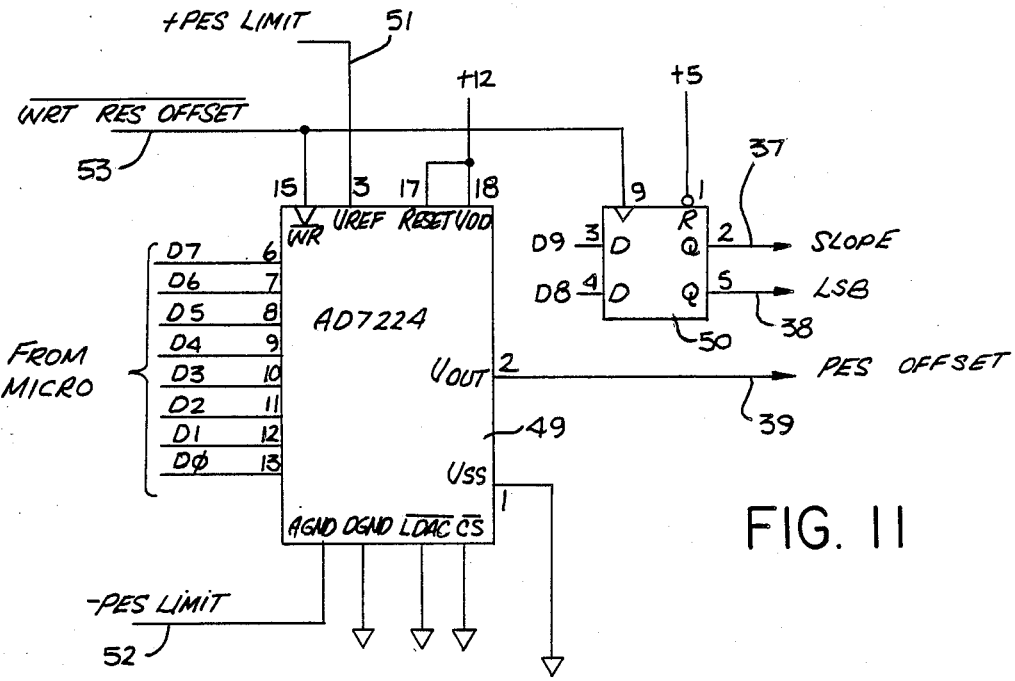
FIG. 11 is an electrical schematic illustrating the PES offset of the present invention.

Referring to FIG. 11, the circuitry for generating the PES offset signal 39 is illustrated. The PES offset signal is scaled so as to provide correction of plus or minus half a track to the head. The midpoint of the PES offset signal range coincides with the center of the track. The nominal range in the preferred embodiment of the present invention for the upper and lower PES offset limits 51 and 52 are 7 and 3 volts respectively. Thus for an input of hex 00, the dac 49 outputs a 3 volt PES offset signal, for an input of hex FF, a 7 volt PES offset signal is generated, and for hex 80 (mid point) a 5 volt PES offset signal is generated.

The upper and lower PES offset limits 51 and 52 are coupled to a digital to analog converter (DAC) 49. The input to the DAC 49 is a digital position word from the microprocessor. The output of the DAC 49 is the PES offset signal 39 The DAC 49 divides the voltage limits by 256 so that there are 256 possible offset voltage outputs. The position information generated by the microprocessor is inputted to the DAC on inputs D0-D7 The two low order bits of the high order byte of the position word are inputted on D8 and D9 of flip-flop 50 and outputted as slope 37 and LSB 38.

The PES offset signal 39 may be calibrated to account for variations in effective head width. This is done by changing the upper and lower. PES offset limits. For example, if the effective head width is wider than the nominal, then a smaller PES offset voltage will be required to represent a one half track correction. For example, if, due to the increased head width, the head is off positionally by a factor of 10%, the upper and lower PES limits 51 and 52 are decreased by 10% respectively.

If the effective head width is narrower than the nominal, additional voltage will be required to represent a half track correction with respect to the nominal. In that situation, the upper and lower PES offset limits 51 and 52 are increased by a percentage representing the correction factor required.

IOFFSET DAC

The DAC 54 for generating the IOFFSET signal 57 is illustrated in FIG. 12. As noted previously, the IOFFSET signal 57 controls the current to the actuator motor and thus controls the acceleration of the head of the present invention. A digital acceleration word is inputted to the DAC 54 from the microprocessor. The output of the IOFFSET DAC 54 ranges between the upper IOFFSET limit 55 and the lower IOFFSET limit 56. The nominal value: for the upper and lower IOFF set limit 55 and 56 in the preferred embodiment of the present invention are 3.5 and 1.5 volts respectively. In another words, at HEX word 00, the IOFFSET output is 1.5 volts, at HEX word FF, the IOFFSET value is 3.5 volts and at the mid point, at HEX word 80, is 2.5 volts.

In order to compensate for differences in magnet strength between disk drives, the upper and lower IOFFSET may be adjusted so as to calibrate the IOFFSET output signal 57 appropriately. The upper and lower limits are each decreased or increased according to the percentage error introduced by variations in magnet strength of the actuator motor.

In this manner, the same digital word may always be utilized to represent the same percentage variation from the center of track or the same amount of accelleration. For example, regardless of head position, digital word representing a value 10% off track will always be the same digital word. However, variations in the upper and lower PES offset limits will result in a different voltage being output for the digital word. The same is true for IOFFSET. This allows the same software to be consistently utilized in a variety of disk drive settings.

GAIN ADJUST DAC

Figure 10:
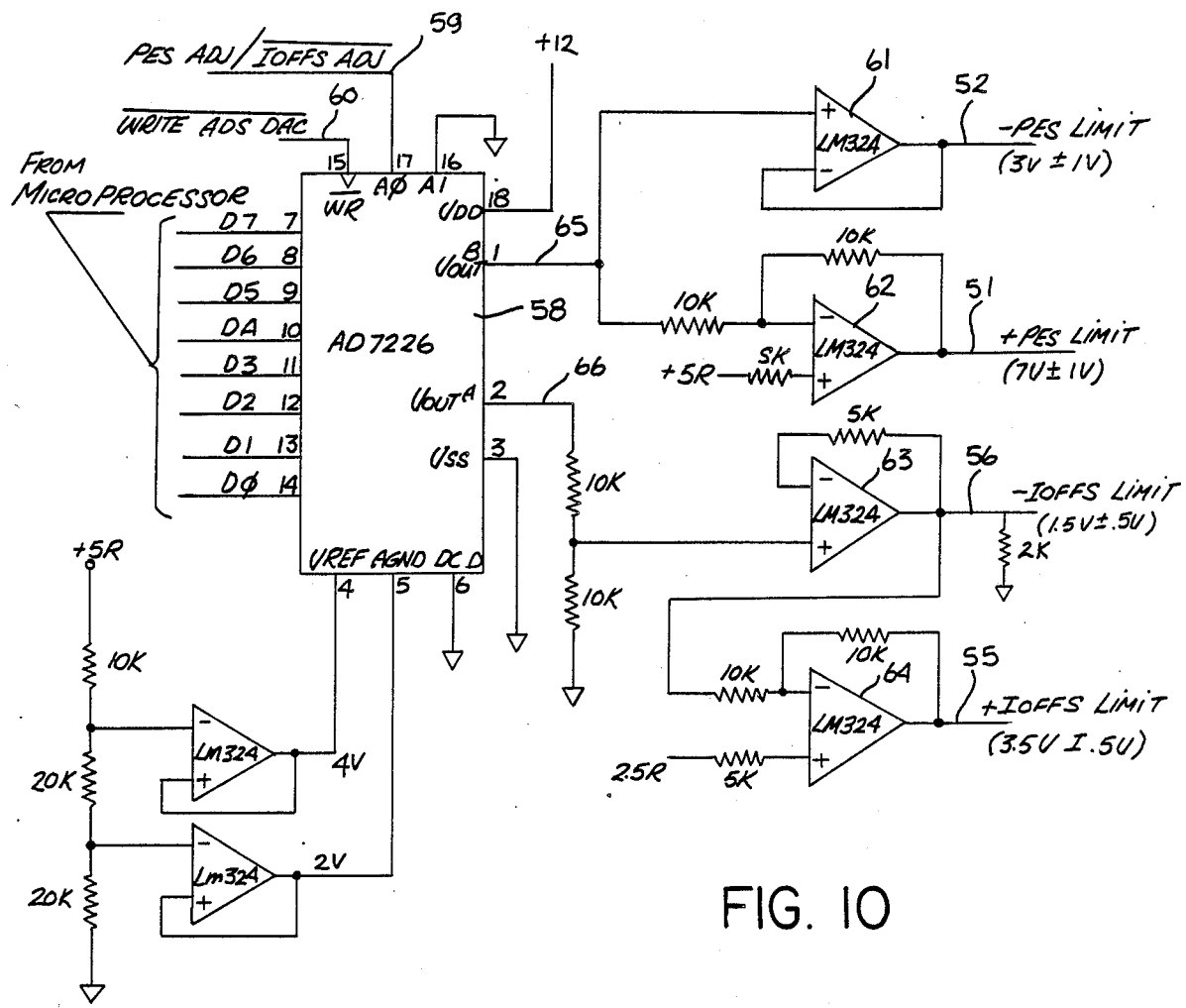
FIG. 10 is an electrical schematic illustrating the gain adjust of the present invention.

The gain adjust dac 58 illustrated in FIG. 10 is used to generate both the upper and lower PES offset limits 51 and 52 and the upper and lower IOFFSET limits of DACs 49 and 54. The effective head width affects the voltage signal picked up by the servo heads. For example, a current head position may have a nominal position voltage of 1 volt. However, a variation in the effective head width could result in an actual output voltage of 1.1 volts for the same position.

On power up, as previously discussed, the microprocessor determines the effective head width and calibrates the upper and lower PES and current offset limits. The microprocessor tracks the actual PES with the nominal PES and determines the error between them. This error is used to generate a digital word which is inputted to the gain adjust dac 58 on inputs D0-D7. Dac 58 has two outputs 65 and 66. The output signal on line 65 is coupled to the noninverting input of operational amplifier 61 and, through a resistor, to the inverting input of operational amplifier 62. The inverting input of op amp 61 is coupled to the output of op amp 61. The output of op amp 61 is the lower PES offset limit 52 and varies within plus or minus 1 volt of the 3 volt nominal value.

The output of op amp 62 is coupled through a resistor to the inverting input of op amp 62. The input to the noninverting input of op amp 62 is a 5 volt voltage source. The output of op amp 62 is the upper PES offset limit and varies within plus or minus of 1 volt of the nominal 7 volt value.

In addition to the test to determine effective head width, the microprocessor also generates a seek so that the variation in the tolerance of the magnet may be determined. For this test seek, the head will be subjected to maximum acceleration for a fixed period of time with the microprocessor monitoring position information and comparing it with nominal position information. In this manner, the torque constant of the disk drive can be determined and the IOFFSET signal calibrated so that the appropriate current input to the actuator motor to achieve the desired acceleration may be automatically achieved. During the acceleration test seek, the microprocessor outputs a digital word to the gain adjust DAC 58. The output on line 66 of the Dac 58 is coupled through a resistor to the noninverting input of op amp 63. The output of op amp 63 is coupled to the inverting input of op amp 63 as well as through a resistor to the inverting input of op amp 64. A 2.5 volt source is coupled through a resistor to the noninverting input of op amp 64. The output of op amp 64 is coupled through a resistor to the inverting input of op amp 64. The output of op amp 63 is coupled to a pull down resistor. The voltage at this node represents the lower IOFFSET limit 56 and is 1.5 volts plus or minus a half of volt. The output of op amp 64 is the upper IOFFSET limit 55 and is nominally 3.5 volts plus or minus 0.5 volts.

Thus, on power up, gain adjust factors are calibrated and used to modify the range of the PES signal and IOFF set signal so that automatic compensation for variations in disk performance may be accounted for.

Because of the gradual deceleration of the servo head utilizing the present invention, settling actually occurs during the deceleration ramp time. Thus, the time required for settling at the end of a seek by prior art methods is significantly reduced utilizing the present invention so that a mean access time equal to or less than that achieved by prior art methods may be had.

Although the present invention has been described in terms of a gradual linear acceleration profile, any other gradual (noninstantaneous) acceleration may be utilized as well. For example, a curved acceleration profile or a stepped profile may be employed without departing from the scope of the present invention.

Thus, an inventive method and apparatus for controlling servo head position during a seek operation has been described.

What is claimed is:

1. In a magnetic disk storage system having data stored on a plurality of tracks on a rotating disk and accessed by at least one magnetic head moved across the surface of said disk by an actuator motor, an apparatus for controlling a seek operation in which said head is moved from a starting track to an end track, said apparatus comprising:
   position detection means coupled to said head for detecting current track position and position of said head relative to the center of said current track;
   track following means coupled to said detection means and said actuator motor, said track following means for generating a first signal to said actuator motor to move said head to the center of said current track;
   processing means for generating a seek profile dependent on the length of said seek, said processing means defining a nominal position of said head after each of a plurality of time samples, said nominal position based on said seek profile, said processing means outputting a second signal representing the nominal position of said head at the end of the next successive time sample;
   first converting means coupled to said second signal and to said actuator motor, said first converting means for converting said second signal into a third signal, said third signal activating said actuator motor to move said head to said nominal position;
   second converting means coupled to said second signal and to said track following means, said second converting means for converting said second signal into a fourth signal, said fourth signal combining with said first signal and activating said actuator motor to move said head to said nominal position;
   said seek profile generated by said processing means such that said head is gradually accelerated in the direction of said end track to a peak acceleration, gradually decelerated to a peak deceleration and then gradually decelerated to zero acceleration, such that said head has zero velocity at said end track;
   whereby said seek may be controlled utilizing track following circuitry.

2. The apparatus of claim 1 further including gain adjustment means coupled to said processing means and to said first and second converting means, said gain adjustment means outputting fifth and sixth signals to said first and second converting means to compensate for variations in operating parameters of said head and said actuator motor.

3. The apparatus of claim 2 wherein said first and second converting means comprise digital to analog converters.

4. The apparatus of claim 3 wherein said gain adjustment means comprises a digital to analog converter.

5. The apparatus of claim 4 wherein each of said tracks includes two pairs of channels, said track following means determining the position of said head with respect to said channels in one of said pairs of channels.

6. In a magnetic disk storage system having data stored on a plurality of tracks on a rotating disk and accessed by at least one magnetic head moved across the surface of said disk by an actuator motor, an apparatus for controlling a seek operation in which said head is moved from a starting track to an end track, said apparatus comprising:
   detection means coupled to said head for detecting current track position and position of said head relative to the center of said current track;
   track following means coupled to said detection means and said actuator motor, said track following means for generating a first signal to said actuator motor to move said head to the center of said current track;
   processing means for generating a seek profile dependent on the length of said seek, said processing means defining a nominal position of said head after each of a plurality of time samples, said nominal position based on said seek profile, said processing means outputting a second signal representing the nominal position of said head at the end of the next successive time sample;
   first converting means coupled to said second signal and to said actuator motor, said first converting means for converting said second signal into a third signal, said third signal activating said actuator motor to move said head to said nominal position;
   second converting means coupled to said second signal and to said track following means, said second converting means for converting said second signal into a fourth signal, said fourth signal combining with said first signal and activating said actuator motor to move said head to said nominal position;
   said seek profile generated by said processing means such that said head is gradually accelerated in the direction of said end track to a peak acceleration, gradually decelerated to a peak deceleration and then gradually decelerated to zero acceleration;

said processing means and said first and second converting means connected to gain adjustment means, said gain adjustment means outputting fifth and sixth signals to said first and second converting means to compensate for variations in operating parameters of said head and said actuator motor;

whereby said seek may be controlled utilizing track following circuitry.

7. The apparatus of claim 6 wherein said first and second converting means comprise digital to analog converters.

8. The apparatus of claim 7 wherein said gain adjustment means comprises a digital to analog converter.

9. The apparatus of claim 8 wherein each of said tracks includes two pairs of channels, said track following means determining the position of said head with respect to said channels in one of said pairs of channels.

* * * * *

UNITED STATES PATENT AND TRADEMARK OFFICE
CERTIFICATE OF CORRECTION

PATENT NO. : 4,937,689

DATED : June 26, 1990

INVENTOR(S) : Seaver et al.

It is certified that error appears in the above-identified patent and that said Letters Patent is hereby corrected as shown below:

In the drawings, sheet 10, element number "14" labeled in Figure 14
    should be deleted and rewritten as element number --19--.
In column 1, line 39, after the word "various", delete "of the".
In column 2, line 10, delete "of", and insert in place thereof --for--.
In column 3, line 13, delete "detail", and insert in place thereof --details--;
    line 30, delete "accelleration", and insert in place thereof --acceleration--.
In column 5, line 40, after the number "4", insert a closing parenthesis.
In column 6, line 7, delete "tj3" and insert in place thereof --$tj^3$--;
    line 56, delete "Tm" and insert in place thereof --tm--.
In column 8, line 13, delete the period and insert in its place a colon;
    line 13, delete "A" and insert in place thereof --a--;
    line 14, delete the period and insert in place thereof a semicolon;
    line 15, before the word "and", insert a semicolon;
    line 21, before the word "Having", insert a period;
    line 65, delete "tca2", and insert in place thereof --tcal--.
In column 9, line 29, delete "die bits", and insert in place thereof --dibits--;
    line 52, delete "of", first occurrence and insert in place thereof --or--;
    line 57, delete "a", and insert in place thereof --an--.
In column 11, line 18, delete "amplifiers", and insert in place thereof --s/h--;
    line 43, delete "represent", and insert in place thereof --represents--.
In column 12, line 16 and 17, delete "portional" and insert in place thereof --proportional--;
    line 32, delete "o", and insert in place thereof --on--;
    line 48, delete "7", and insert in place thereof --76--;
    line 58, delete "is"; (first occurrence).
    line 62, delete "that".

UNITED STATES PATENT AND TRADEMARK OFFICE
CERTIFICATE OF CORRECTION

PATENT NO. : 4,937,689

DATED : June 26, 1990

INVENTOR(S) : Seaver et al.

It is certified that error appears in the above-identified patent and that said Letters Patent is hereby corrected as shown below:

In column 13, line 12, the number "4" should not be boldfaced and the word "resistor" should read --resistors--;
  line 13, delete ":;ill", and insert in place thereof --will--;
  line 27, and column 14, lines 25, 40 and 68, the word "dac" should read as --DAC--;
Col. 13 line 35, a period should be inserted after the number "39";
  line 38, a period should be inserted after the word "D7";
  line 44, the period should be deleted after the word "lower".
In column 13, line 68, and column 14, line 1, delete the word "IOFF set" and insert in place thereof --IOFFSET--.
In column 14, line 3, delete "another", and insert in place thereof --other--;
  line 15, delete "accelleration", and insert in place thereof --acceleration--;
  line 53, delete "of", first occurrence.
In column 15, line 11, before the word "volt", insert --a--;
  line 16, delete "IOFF set", and insert in place thereof --IOFFSET--.
In Column 13, line 68, delete "value:" should read --value--.

Signed and Sealed this

Twelfth Day of October, 1993

BRUCE LEHMAN

*Attest:*

*Attesting Officer*   Commissioner of Patents and Trademarks